Patented Jan. 11, 1944

2,339,231

UNITED STATES PATENT OFFICE 2,339,231

PROCESS OF PREPARING PAVING MIXTURES

Charles Mack, Courtright, Ontario, Canada, assignor, by mesne assignments, to Standard Catalytic Company, a corporation of Delaware No Drawing. Application September 27, 1938, Serial No. 231,901

5 Claims. (Cl. 106—269)

This invention relates to improvements in adhesivity of solids with plastics, semi-plastics or viscous liquids, both organic and inorganic. It relates particularly to improvements in the adhesivity of petroleum oils and their derivatives to organic and inorganic materials.

Paving materials are generally composed of mineral aggregates bonded together by means of asphalt. Certain mineral aggregates due to their chemical compositions are more strongly bonded than others and resist water displacement to a greater degree, but in the laying of bituminous pavements the kind of mineral aggregate used is determined by the types of mineral aggregates that are available in the regions where the pavements are being laid. Therefore, it is very desirable to have asphaltic compositions that will bond all types of mineral aggregates regardless of the chemical compositions of the said aggregates.

It is well known that when a metallic surface is to be coated with a paint, it is generally necessary to first coat the metallic surface with a primer which will adhere to the metal and serve as a binder for the outer coat of paint as the paint as applied without the primer would tend to peel upon weathering. Therefore, it is desirable to improve the adhesivity of the paints to such a degree that the use of a priming coat will not be necessary.

The moving metal parts of a machine when in contact with each other will mutually wear or if they differ in hardness, the softer metal will wear. This is generally overcome by maintaining a thin film of a lubricant between the moving metal parts of the machine. Where these two parts are operated at high pressures, it is very difficult to maintain this thin film of the lubricant between the moving metal parts. Therefore, it is very desirable to have a lubricant that will strongly adhere to the metal and not be easily expelled by the pressure exerted by the weight or the load of one metal on the surface of the other metal.

Cotton after being dyed with certain dyestuffs, such as alizarine dyestuffs, receives first a treatment with olive oil or Turkey red oil and then a treatment with water-soluble salts of aluminum, iron or chromium. It is very desirable to use a salt solution that may be used to impregnate the cloth without following the two steps to form the salt in situ.

Other textiles after being dyed with certain dyestuffs likewise require an after treatment with water-soluble metallic salts in order to improve their fastness to light and washing. There is large room for improvement in treating the dyed material to improve the adhesivity of the dye and the water-repelling property to a greater degree.

It is the object of this invention to provide a composition which when added to asphalts, lubricating oils, paints, dyes and dyed materials will improve the adhesivity of these compositions to both organic and inorganic materials.

It has been found that the double salts of bi- and multi-valent metals containing simultaneously acid radicals of high and low molecular weight when added to a mineral oil or its derivative to dyes or dyed materials and to paints will improve the adhesivity or adherence of the mineral oil or its derivative, dyes or paints to organic and inorganic solid bodies. These salts are prepared by heating metal salts of low molecular weight acids such as those of 120 molecular weight and lower or their basic salts with organic acids of high molecular weight, such as those having a molecular weight above 120. The acids of low molecular weights that are used are those that boil at lower temperatures than the acids of high molecular weights, and generally have less than 6 carbon atoms to the molecule. The metal salts prepared from these acids are the chlorides, acetates, propionates, butyrates, etc. The acids of high molecular weight are carboxylic and sulfonic acids of aliphatic or cyclic structure, such as fatty acids, acids obtained by the oxidation of paraffin wax, naphthenic acids, sulfonic acids obtained from petroleum refining operations by means of sulfuric acid, etc. Other high molecular weight acids that may be used are phenols, creosotes and fatty acid pitches. The double salts are obtained by heating a metal salt of the low molecular weight acid with the acids of high molecular weight, for example, by heating 1 mol of basic lead acetate, $PbOH(CH_3CO_2)$ with 1 mol of naphthenic acid at an elevated temperature to form a double salt of the lead. Salts of other di- and multi-valent metals, e. g., iron, aluminum, chromium, copper, mercury, etc. may be used in the preparation of the double salts.

According to this invention these double salts as they are insoluble in asphalt and hydrocarbons in general require the addition of a mutual solvent to dissolve therein the asphalt or other hydrocarbons. The mutual solvents that are preferred are fatty acids such as naphthenic and/or oleic acids or metal salts of these fatty acids such as lead naphthenates, etc. The proportion of mutual solvent used is about 1 mol of the solvent for each mol of the double salt. The proportion of double salts used in the asphalt are from 1 to 5% or 10%.

The following table for purposes of comparison shows the various periods of time required to remove asphalt one free of salts, one containing a simple salt and one containing a double salt from the surfaces of mineral aggregates when the said mixtures of various asphalts and mineral aggregates are subjected to the shaking tests. The amount of wetting agent, simple or double salt added is the same in all cases, which is $1/500$ mol per cent.

| Wetting agent in asphalt | Shaking time in minutes |
|---|---|
| Lead naphthenate | 60 |
| Lead acetate-naphthenate+naphthenic acids | 500 |
| Ferric naphthenate | 20 |
| Ferric acetate-naphthenate+naphthenic acids | 260 |
| None | 10 |

The double salts are also of particular value in tanning leather especially to finish the leather. Prepared skins or furs are treated with a naphtha solution containing 10% of a mixture of equivalent parts of aluminum, chromic or ferric acetate-oleate and oleic or other fatty acid. The skins are slowly dried and finished.

A leather similar to chamois is obtained when the above mentioned double salts are prepared from fish oil acids and incorporated in the naphtha with the aid of the same acids. Skins prepared in such a way are first slowly dried at ordinary temperature and then exposed to elevated temperature not exceeding 140° F.

In order to resist termites and fungus growth, timber is treated with a 10% solution of copper acetate-naphthenate or mercuric acetate-naphthenate in a mineral oil such as heavy gas oil containing enough naphthenic acids to keep the double salts in solution. Insecticides and fungicides can be incorporated in the said solution. When naphtha is used as a solvent, the treated wood can be painted over.

The invention is not to be limited to the specific embodiments shown or the specific examples given, nor to any theories advanced as to the operation of the invention, but in the appended claims it is intended to claim all inherent novelty in the invention as broadly as the prior art permits.

I claim:

1. The process of preparing a paving mixture which comprises mixing a mineral aggregate with an asphalt containing lead acetate-naphthenate.

2. A process of preparing a paving mixture which comprises mixing a mineral aggregate with an asphalt containing lead acetate-naphthenate and naphthenic acid.

3. The process of preparing a paving mixture which comprises mixing a mineral aggregate with an asphalt containing a double salt of the class consisting of lead acetate-naphthenate, ferric acetate-naphthenate, copper acetate-naphthenate, and mercuric acetate-naphthenate.

4. A process according to claim 3 in which the double salt is ferric acetate-naphthenate.

5. A process according to claim 3 in which the double salt is copper acetate-naphthenate.

CHARLES MACK.